Sept. 4, 1934.    H. HERMLE    1,972,683
CONTROL SYSTEM
Filed April 10, 1933

Inventor:
Hermann Hermle,
by Charles V. Tullar
His Attorney.

Patented Sept. 4, 1934

1,972,683

UNITED STATES PATENT OFFICE 1,972,683

CONTROL SYSTEM

Hermann Hermle, Berlin-Lankwitz, Germany, assignor to General Electric Company, a corporation of New York Application April 10, 1933, Serial No. 665,415
In Germany April 27, 1932

8 Claims. (Cl. 172—179)

This invention relates to control systems for traction drives, more particularly to systems for controlling the rates of acceleration and deceleration of electrically driven cars, and has for an object the provision of a simple, reliable and inexpensive means for limiting to a predetermined value the acceleration and deceleration of the car between controller steps.

Heretofore in the design of control systems for electrically driven cars, the schedule speed has been increased by increasing the rates of acceleration and deceleration. This has necessitated the provision of an increased number of starting and braking steps in order to insure a gentle and jolt-free starting and braking. Because of the increased number of switches required, the switching mechanism is more complicated and consequently more expensive.

In accordance with the present invention, an auxiliary dynamo-electric machine is arranged to control the field excitation of the motor driving means so as to produce a smooth acceleration and deceleration of a car. More specifically, provision is made for connecting and disconnecting the dynamo-electric machine in circuit with the respective motor field windings so that the excitation of the motors is controlled as a function of the counter-electromotive force of the dynamo-electric machine. Preferably, the rotor of the dynamo-electric machine is connected to a fan or a flywheel to provide sufficient inertia for the movable parts of the machine.

Figure 1:
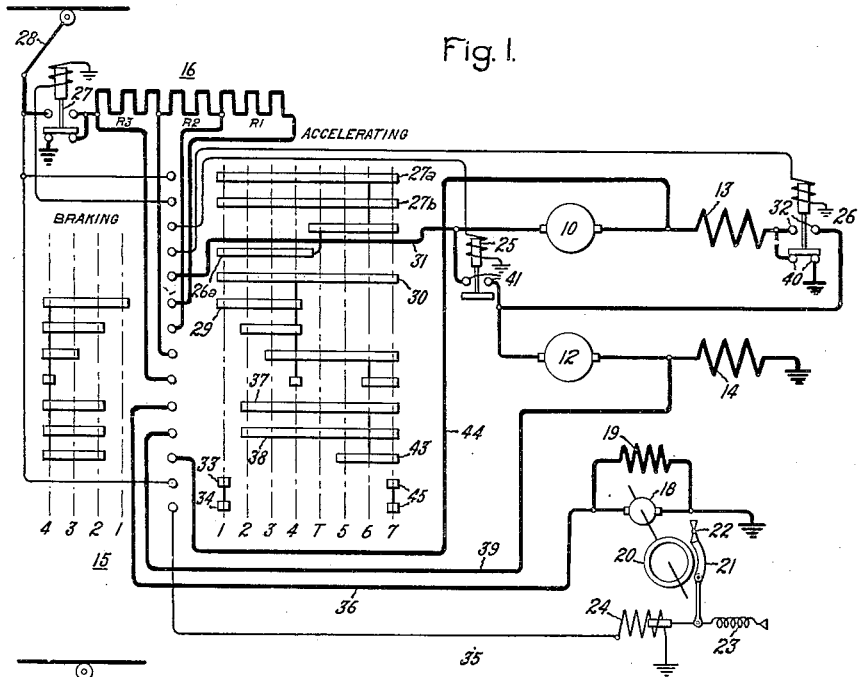
Figure 2:
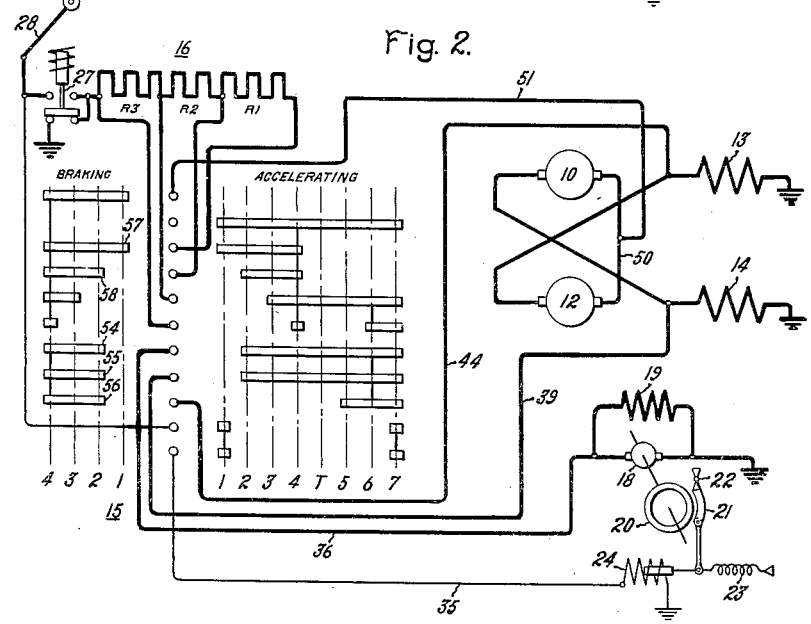

For a more complete understanding of the invention, reference should be had to the accompanying drawing wherein I have diagrammatically illustrated in Fig. 1 my invention applied to a control system, while in Fig. 2 the system of Fig. 1 is shown connected for dynamic braking.

Referring now to the drawing, I have shown my invention in one form as applied to the control of the acceleration and the deceleration of the motors 10 and 12, respectively, provided with field windings 13 and 14. The controller 15 provides a plurality of accelerating notches or positions for the forward movement of the cars with the motors first connected in series and then in parallel relation. A plurality of braking notches are provided for controlling deceleration when the motors are connected for dynamic braking. The starting and braking resistance 16 is connected to the controller 15 so that the resistor sections R1, R2 and R3 may be successively short circuited to control the energization of the driving motors. The armature of the dynamo-electric machine 18 is arranged to be connected across the field winding 14 of the motor 12 during series operation and in shunt relation with field windings 13 and 14 during parallel operation of the driving motors. A self-excited shunt field winding 19 is provided for the dynamo-electric machine 18 which operates as a shunt motor. In order to provide sufficient inertia for the armature of the dynamo-electric machine, it is provided with a flywheel 20. A brake 21 is pivoted at 22 and is normally biased away from the flywheel by a spring 23. Whenever the brake operating coil 24 is energized, the brake 21 is brought into engagement with the flywheel to stop the dynamo-electric machine 18. The transfer from the series connection of the driving motors to the parallel connection is accomplished by the operation of the transfer switches 25 and 26.

In the operation of the invention it will be assumed that the trolley 28 is energized and that the controller 15 is moved into the first position or the first notch for the forward rotation of the driving motors. The line switch 27 is closed by segments 27a and 27b and the transfer switch 26 is energized by segment 26a to connect the motors in series circuit relation and current may flow through the motors through a circuit which may be traced from the trolley 28, accelerating resistors R3, R2 and R1, controller segments 29 and 30, conductor 31, armature of motor 10, field winding 13, contacts 32 of transfer switch 26, armature of motor 12 and by field winding 14 to ground. It will be observed that an energizing circuit is also completed for the brake operating coil 24. This circuit may be traced from the trolley 28, controller segments 33 and 34, conductor 35, brake operating coil 24 and to ground. The motors 10 and 12 therefore exert a powerful starting torque in the first notch and the dynamo-electric machine 18 has no effect whatsoever because the brake 21 holds its armature at a standstill.

In the second notch the accelerating resistor R1 is short circuited, the brake operating coil 24 is deenergized, so that the spring 23 releases the brake. In the second position the dynamo-electric machine 18 is connected in parallel with the field winding 14 of the motor 12. A circuit may be traced from the grounded side of the dynamo-electric machine, through its armature by conductor 36, controller segments 37 and 38, conductor 39 and by field winding 14 to ground. Since the armature of the dynamo-electric machine 18 is stationary when the controller is moved into the second notch, the resistance through the armature is quite low so that the main field 14 of the motor 12 is only partially excited, the major portion of the current flowing through the machine 18. The reduced excitation of the motor correspondingly reduces the motor torque to limit the rate of acceleration. The current by-passed through the shunt motor or dynamo-electric machine 18, however, causes it to accelerate with the consequent generation of counter-electromotive force. As its counter-electromotive force increases, its effective resistance increases and gradually causes the current flowing through the field winding 14 to increase. It is by this means that a gradual rate of acceleration is produced between accelerating notch 1 and accelerating notch 2. It will be understood that the same action takes place when the controller 15 is operated to notches 3 and 4. Between each accelerating step, part of the current is by-passed around the field winding 14 through the dynamo-electric machine which in turn gradually increases its counter-electromotive force so as to increase the excitation on the machine 12 and to cause it to produce gradually the acceleration of the car.

When the controller is moved to the transition position T, the motor connections are changed from the series relation to the parallel relation. This transition is accomplished by the deenergization of the transition switch 26 which is operated to close its contacts 40 and by the energization of the transition switch 25 to close its contacts 41. The dynamo-electric machine 18 controls the rate of acceleration during the transition. Thus, when the controller 15 is moved to notch 5, the dynamo-electric machine 18 is connected in parallel with the field winding 13 of the motor 10 by means of controller segment 43 and conductor 44. It will, therefore, be seen that since the dynamo-electric machine 18 is now connected in parallel with both field windings, it controls the rates of rise of the excitation on both motors 10 and 12 during their parallel operation. In the accelerating notch 6 the resistors R1, R2 and R3 are short circuited. The operation of the controller 15 to the last notch 7 completes an energizing circuit for the brake operating winding 24 by means of the controller segments 45. As described above, the brake 21 is applied to the flywheel and the dynamo-electric machine 18 is gradually brought to a standstill. As the speed of the dynamo-electric machine decreases its counter-electromotive force decreases with the result that the proportion of field current by-passed increases. After the machine 18 is brought to a standstill, the armature 18 provides a low resistance shunt for the motor field windings.

If it is desired to dynamically brake motors 10 and 12, it is only necessary to return the controller 15 to its initial position, to connect the motors as shown in Fig. 2 and to operate the controller to the braking position. In the first braking notch or position with the motors 10 and 12 connected as shown in Fig. 2, the switch 27 is deenergized to disconnect the resistor R3 from the trolley 28 and to connect the resistor to ground. In this position the braking circuit may be traced from conductor 50 connecting common sides of the motor armatures together, by conductor 51, resistors R1, R2 and R3 to ground and by the ground connection to the field winding 14 of motor 12 and to the other side of the armature of motor 10; and by the ground connection through the field winding 13 of motor 10 and to the other side of the armature of motor 12. The cross connection of the field windings of the motors is well understood by those skilled in the art.

When the controller 15 is operated to the second braking position the armature of the dynamo-electric machine 18 is connected in parallel relation with the field windings 13 and 14. The connections are completed by means of conductor 36, controller segments 54, 55 and 56 and conductors 44 and 39. The braking resistor R1 is short circuited in the second position by means of the controller segments 57 and 58 to increase the braking current. However, the dynamo-electric machine 18 functions to control the rate of deceleration so that the braking effort is gradually increased.

It will be remembered that the controller 15 was operated from the accelerating position 7 to its initial position. As the controller was moved into the first accelerating step the brake operating coil 24 was energized to operate the brake 21. Therefore, when the controller 15 was operated to the braking position the armature of dynamo-electric machine 18 was at a standstill, or rotating at a low speed. Therefore, in the second braking position a substantial part of the increased braking current generated by the respective motors is by-passed from the field windings through the dynamo-electric machine 18 to limit the rate of deceleration.

The dynamo-electric machine 18 for the second braking notch and for the additional braking notches 3 and 4 operates in the same manner as before to provide an even retardation of the car by the control of the rate of deceleration.

It will be understood, of course, that a fan may be substituted for the flywheel 20, the fan providing substantially the same characteristics as the flywheel.

It is to be further understood that instead of utilizing a mechanical brake, as shown, any suitable friction means as, for example, an eddy-current brake may be applied to the dynamo-electric machine 18.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination with an electrically driven car, driving motors therefor each provided with a series field winding, a plurality of accelerating resistors, a controller operable through a plurality of resistor short-circuiting positions for controlling the energization of said motors, a self-excited dynamo-electric machine, connections arranged to be completed by the operation of said controller to one of its positions for connecting said dynamo-electric machine in parallel circuit relation with one of said field windings to control the rates of acceleration of said car as said resistors are short circuited, means associated with said controller for connecting said motors in parallel circuit relation for one of its positions, and means for connecting said dynamo-electric machine in parallel circuit relation with all of said field windings to control jointly and simultaneously the field excitation of all of said parallel connected motors.

2. In combination, a pair of driving motors each provided with a series field winding, a plurality of accelerating resistors, means for connecting said motors in series circuit relation with said resistors and for successively short circuiting said resistors to accelerate said motors, a self-excited dynamo-electric machine, connections for connecting said machine in parallel circuit relation with one of said field windings and a kinetic energy storing device for said dynamo-electric machine for insuring a smooth and gradual acceleration as said resistors are short circuited, and means for connecting said motors in parallel circuit relation and for connecting said dynamo-electric machine in parallel circuit relation with both of said field windings.

3. In combination, a pair of driving motors each provided with series field windings, a plurality of accelerating resistors, means for controlling the energization of said motors including a controller for initially connecting said motors in series circuit relation with said field windings and said resistors, a dynamo-electric machine provided with a kinetic energy storing device, friction means for maintaining said dynamo-electric machine at a standstill, a plurality of accelerating notches on said controller for successively short circuiting said resistors, connections completed when said first resistor is short circuited for connecting said dynamo-electric machines in parallel circuit relation with one of said field windings and for releasing said friction means so that the rise in current caused by the short circuiting of said first resistor does not initially increase the excitation of said field winding connected in shunt circuit relation with said machine, the counter-electromotive force of said machine gradually causing said field excitation to increase to produce a gradual acceleration of said motors, and means responsive to the operation of said controller for connecting said motors in parallel circuit relation and for connecting said dynamo-electric machine in parallel circuit relation with each of said series field windings whereby the acceleration of said motors is controlled between successive accelerating steps both for series and parallel operation of said motors.

4. The combination with a traction drive having a plurality of driving motors, of means for controlling the energization of said motors in series and parallel connections to accelerate said motors through a plurality of speeds, means for controlling the acceleration of said motors between speed steps comprising a dynamo-electric machine provided with a kinetic energy storing device, means for connecting said dynamo-electric machine in parallel circuit relation with one of said field windings as said motors are accelerated in the series connection and for connecting said machine in parallel circuit relation with all of said field windings when said motors are accelerated in the parallel connection.

5. In combination, a plurality of driving motors each provided with a field winding, control means for controlling the energization of said motor to accelerate said motors, and a shunt motor normally connected in shunt circuit relation with said field windings, the speed of said shunt motor being a function of the potential drop across said field windings, and friction means associated with said shunt motor for reducing the speed of said shunt motor in response to a predetermined operation of said control means.

6. In combination, a plurality of driving motors each provided with a field winding, control means for controlling the energization of said motors to accelerate said motors, a dynamo-electric machine arranged to be connected in shunt circuit relation with said field windings, the speed of said dynamo-electric machine being a function of the potential drop across said field windings, and friction means operatively associated with said machine for decreasing the speed of said dynamo-electric machine and means operable by said control means for operating said friction means to decrease the energization of said field windings, said friction means finally operating to bring said machine to a standstill with the field windings shunted by said machine.

7. In combination with an electrically driven vehicle, a pair of driving motors therefor each provided with a series field winding, an accelerating resistor, a controller operable through a plurality of circuit controlling positions, said controller when operated to its first position connecting said motors, said field windings and said resistor in series circuit relation and when in said other positions excluding predetermined values of said resistor from said series circuit, a shunt motor, connections completed by the operation of said controller to its second position for connecting said motor in shunt circuit relation with one of said series field windings, said shunt motor modifying the accerelation of said corresponding series motor to produce a gradually increasing acceleration of said vehicle between each of said first and second steps, and electrically operated friction means energized by said controller when in said first position for maintaining said shunt motor at a standstill.

8. In combination with an electrically driven car, driving motors therefor provided with series field windings, control means operable through a plurality of steps for controlling the energization of said motors to accelerate said car, a shunt motor, connections completed by said control means for connecting said shunt motor in shunt circuit relation with said series field windings to produce a gradual change in acceleration of said motors between said steps, and friction means responsive to said control means and operatively associated with said shunt motor for gradually decreasing its speed to decrease gradually and progressively the excitation of said motors.

HERMANN HERMLE.